United States Patent [19]

Fujikake et al.

[11] 4,440,920

[45] Apr. 3, 1984

[54] AROMATIC POLYESTERS

[75] Inventors: Shiro Fujikake; Motoo Kawamata; Hikotada Tsuboi, all of Kanagawa, Japan

[73] Assignee: Mitsui Toatsu Chemicals, Inc., Tokyo, Japan

[21] Appl. No.: 453,893

[22] PCT Filed: Apr. 28, 1982

[86] PCT No.: PCT/JP82/00142

§ 371 Date: Dec. 10, 1982

§ 102(e) Date: Dec. 10, 1982

[87] PCT Pub. No.: WO82/03867

PCT Pub. Date: Nov. 11, 1982

[30] Foreign Application Priority Data

Apr. 30, 1981 [JP] Japan ................................ 56-64255

[51] Int. Cl.$^3$ ...................... C08G 63/18; C08G 63/66; C08G 63/68

[52] U.S. Cl. .................................. 528/128; 528/125; 528/173; 528/176; 528/191; 528/193; 528/194

[58] Field of Search ............... 528/125, 128, 173, 176, 528/193, 194, 191

[56] References Cited

U.S. PATENT DOCUMENTS

| | | | |
|---|---|---|---|
| 4,116,940 | 9/1978 | Korshak et al. | 528/173 |
| 4,225,698 | 9/1980 | Medem et al. | 528/128 |
| 4,390,682 | 6/1983 | Kyo et al. | 528/173 |

*Primary Examiner*—Lester L. Lee
*Attorney, Agent, or Firm*—Albert L. Jeffers; Douglas L. Miller

[57] ABSTRACT

Aromatic polyesters are obtained by copolycondensing isophthalic acid and terephthalic acid or derivatives thereof with bis(hydroxyphenyl) sulfone and 2,2-bis(4'-hydroxyphenyl)propane.

These aromatic polyesters have excellent molding workability. From these polyesters, colorless, transparent moldings can be obtained by compression, extrusion or injection molding methods. The products thus obtained have excellent mechanical and electrical properties and improved heat resistance.

5 Claims, No Drawings

AROMATIC POLYESTERS

FIELD OF THE INVENTION

The present invention relates to aromatic polyesters having excellent heat resistance and molding workability.

BACKGROUND OF THE ART

The present invention relates to aromatic polyesters having excellent heat resistance and molding workability.

It has been known that aromatic polyesters obtained by reacting terephthalic acid and isophthalic acid or derivatives thereof with 2,2-bis(4'-hydroxyphenyl)propane or a derivative thereof have excellent mechanical properties such as tensile strength and bending strength, thermal properties such as heat distortion temperature and thermal decomposition temperature and electric properties.

However, the thermal properties of these aromatic polyesters are not always satisfactory from the viewpoint of heat resistance required recently of high-performance resins, while their thermal properties are superior to those of araliphatic polyesters such as polyethylene tere-phthalate.

Particularly, these high-performance resins are used frequently in electric or electronic field and various requirements such as a heat resistance in a soldering bath have been put forth. The above-mentioned, known aromatic polyesters are unsatisfactory to cope with these requirements in the practical field. It is thus demanded to further broaden a working temperature range of the resins.

Detailed investigations were already made on fully aromatic polyesters, particularly polyesters comprising terephthalic acid and isophthalic acid or derivatives thereof and 2,2-bis(4'-hydroxyphenyl)propane [see, for example, W. M. Eareckson, J. Polymer Sci., 40, 399–406 (1959)]. As described above, this type of polyesters can be melt-processed to form transparent moldings having excellent mechanical and physical properties. However, the polymers have a glass transition temperature or softening temperature of lower than 200° C. and the resulting moldings have a heat distortion temperature of lower than 170° C. Therefore, it is difficult to use them in fields wherein a very high heat resistance is required or dimensional stability at a high temperature is demanded.

Aromatic polyesters containing bis(hydroxyphenyl) sulfone as a bisphenol component in place of 2,2-bis(4'-hydroxyphenyl)propane have a glass transition temperature of as high as about 265° C., thus showing an excellent heat resistance. However, these aromatic polyesters cannot easily be molded and the resulting moldings tend to become opaque or milky and are quite brittle and easily cracked even if they are produced under optimum molding conditions (see pp. 401–402 of the above reference).

An object of the present invention is to provide aromatic polyesters having an improved heat resistance that has been attained without deteriorating mechanical or electrical properties.

DISCLOSURE OF THE INVENTION

The present invention provides aromatic polyesters comprising structural units shown by the following formulae A, B and C wherein a ratio of the number of structural unit A to the number of structural unit B is 1:0.36–1.06, a ratio of the number of structural unit A to the number of structural unit C is 1:0.04–0.66, a ratio of the number of structural unit A to the number of structural units B and C is 1:0.99–1.10 and logarithmic viscosity number of the polymer is 0.2–2.0:

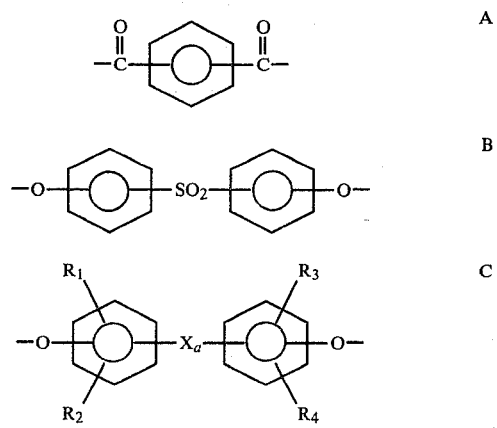

wherein two carbonyl groups in formula A are in a meta or para position with each other, an oxygen atom in formula B is in a meta or para position with an $SO_2$ group, an oxygen atom in formula C is in a meta or para position with X, X in formula C represents a divalent hydrocarbon group having 1–10 carbon atoms, O, CO, S, SO or $SO_2$, a is 0 or 1, and $R_1$ to $R_4$ are the same or different and each represent hydrogen, a hydrocarbon group having 1–8 carbon atoms or a halogen atom with a proviso that when X is $SO_2$, it is excluded that all of $R_1$ to $R_4$ are hydrogen.

According to the present invention, defects of the conventional aromatic polyesters can be overcome and polyesters having excellent heat resistance can be obtained by the copolycondensation of a dicarboxylic acid corresponding to a structural unit of formula A and two bisphenols corresponding to structural units of formulae B and C. From these polyesters, colorless, transparent moldings can be obtained by compression, extrusion or injection molding method. The products thus obtained have sufficient mechanical and physical properties, particularly excellent heat resistance.

BEST MODE FOR CARRYING OUT THE INVENTION

As the dicarboxylic acids corresponding to the structural unit of formula A used for the production of the polyesters of the present invention, there may be mentioned isophthalic acid and terephthalic acid or derivatives thereof. They are used either alone or in the form of a mixture of two or more of them.

In case a mixture of isophthalic acid and terephthalic acid is used, the molar ratio is in the range of 5:95 to 95:5, preferably 30:70 to 70:30.

As the dicarboxylic acid derivatives, there may be mentioned, for example, dichlorides and diesters of them. As the diester-constituting components, there may be mentioned lower aliphatic alcohols having 1–10 carbon atoms and phenols having 6–18 carbon atoms. As concrete examples of the diesters, there may be mentioned dimethyl terephthalate, dimethyl isophthalate, diethyl isophthalate, diethyl terephthalate, diisopropyl isophthalate, di-n-propyl terephthalate, diisobutyl isophthalate, diphenyl isophthalate, diphenyl terephthalate, dibenzyl isophthalate and dibenzyl terephthalate. Mixed diesters containing two alcohol components and monoesters (half esters) may also be used.

As the bisphenol components corresponding to the structural unit of formula B, bis(hydroxyphenyl) sulfones are used. The bis(hydroxyphenyl) sulfones include bis(4-hydroxyphenyl) sulfone, bis(3-hydroxyphenyl) sulfone and 3-hydroxyphenyl 4-hydroxyphenyl sulfone. The bis(hydroxy-phenyl) sulfones may be used alone or in the form of a mixture of isomers thereof.

Bis(4-hydroxyphenyl) sulfone is particularly preferred.

The above-mentioned bis(hydroxyphenyl) sulfones may be subjected to the reaction as such (i.e. in a hydroxyl group-containing form) or in the form of their derivatives such as salts with an alkali metal or alkaline earth metal or esters with an aliphatic or aromatic carboxylic acid. They are selected suitably according to the method and mode of the polymerization reaction.

As the bisphenol components corresponding to the structural unit of formula C, there are used bisphenols of general formula I:

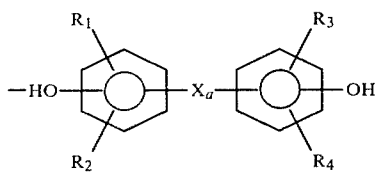

wherein X, a, $R_1$, $R_2$, $R_3$ and $R_4$ have the same meaning as above.

As concrete examples of the bisphenols of formula I, there may be mentioned 2,2-bis(4'-hydroxyphenyl)propane, bis(4-hydroxyphenyl)methane, 2,2-bis(4'-hydroxy-3'-methylphenyl)propane, 2,2-bis(3'-chloro-4'-hydroxyphenyl)-propane, 1,1-bis(4'-hydroxyphenyl)cyclohexane, 1,1-bis(4'-hydroxyphenyl)isobutane, 1,1-bis(4'-hydroxyphenyl)diphenylmethane, 2,2-bis(3',5'-dimethyl-4'-hydroxyphenyl)-propane, bis(3,5-dimethyl-4-hydroxyphenyl)methane, bis(4-hydroxyphenyl) ether, bis(4-hydroxyphenyl) sulfide, bis(4-hydroxyphenyl) sulfoxide, bis(3,5-dimethyl-4-hydroxyphenyl) sulfide, bis(3,5-methyl-4-hydroxyphenyl) sulfone, 4,4'-dihydroxybiphenyl, 3,3',5,5'-tetramethyl-4,4'-dihydroxybiphenyl, 2,2-bis(3',5'-dibromo-4'-hydroxyphenyl)propane, bis(4-hydroxyphenyl) ketone, 2,2'-bis(3',5'-diphenyl-4'-hydroxyphenyl)propane, 1,1-bis(4'-hydroxyphenyl)-1-phenylethane, bis(3-hydroxyphenyl) sulfide, bis(3-hydroxyphenyl) sulfone, 3,3'-dihydroxybiphenyl, bis(3-hydroxyphenyl) ether and 3-hydroxyphenyl 4-hydroxyphenyl ether. They may be used either alone or in the form of a mixture of two or more of them.

As preferred compounds, there may be mentioned 2,2-bis(4'-hydroxyphenyl)propane, bis(4-hydroxyphenyl) methane, 2,2-bis(3',5'-dimethyl-4'-hydroxyphenyl)-propane, bis(4-hydroxyphenyl) ether, bis(4-hydroxyphenyl) sulfide, bis(3,5-dimethyl-4-hydroxyphenyl) sulfone, 4,4'-dihydroxybiphenyl, 3,3',5,5'-tetramethyl-4,4'-dihydroxybiphenyl and bis(4-hydroxyphenyl) ketone.

The amounts of the above-mentioned bis(hydroxyphenyl) sulfones and bisphenols of formula I used for the production of the polymers of the present invention are as shown below:

The amount of the bis(hydroxyphenyl) sulfones is in the range of 0.36–1.06 mol, preferably 0.40–1.0 mol, particularly 0.45–0.96 mol, per mol of the dicarboxylic acid.

The amount of the bisphenols is in the range of 0.04–0.66 mol, preferably 0.08–0.62 mol, per mol of the dicarboxylic acid.

The total amount of the bis(hydroxyphenyl) sulfone and the bisphenol of formula I is in the range of 0.90–1.10 mol per mol of the dicarboxylic acid.

If the amounts of the bis(hydroxyphenyl) sulfones and bisphenols of formula I exceed the above-mentioned ranges, the resulting polymers have inferior properties. If the number of the bis(hydroxyphenyl) sulfone residue is less than 0.36 per dicarboxylic acid residue in the polymer, the polymer has an inferior heat resistance and, on the other hand, if it is more than 1.06, problems often arise in moldability of the polymer and transparency and toughness of the moldings.

If the number of the bisphenol residue in the bisphenol of formula I is less than 0.04 per dicarboxylic acid residue in the polymer, the moldability of the polymer and toughness and transparency of the moldings become insufficient and, on the other hand, if it is more than 0.66, heat resistance of the polymer is reduced.

The polyesters of the present invention has a logarithmic viscosity number $\eta_{inh}$ of 0.2–2.0, preferably 0.3–0.8.

Processes for producing the polymers of the present invention are not particularly limited and any of known processes may be employed. Examples of typical polymerization processes are as follows: interfacial polymerization process wherein the bis(hydroxyphenyl) sulfone, bisphenol of formula I and an alkali metal hydroxide are dissolved in water, isophthaloyl chloride and/or terephthaloyl chloride are dissolved in a water-insoluble organic solvent and both solutions are mixed to carry out the reaction; solution polymerization process wherein the bis(hydroxyphenyl) sulfone, bisphenol of formula I, isophthaloyl chloride and/or terephthaloyl chloride are dissolved in an organic solvent to form a homogeneous solution and the reaction is carried out in the presence of a tert. amine as a dehydrochlorinating agent; fusion polymerization process wherein the isophthalic acid and/or terephthalic acid diester are/is reacted with the bis(hydroxyphenyl) sulfonic acid and bisphenol of formula I by fusion.

The polymers of the present invention may contain one or more of the following reactants or additives, in addition to the above-mentioned components:

Monohydric phenols and alcohols are used for the purpose of not only modifying the molecular weight but also forming a stable terminal group to further improve the stability of the polymer. As concrete examples of the compounds, there may be mentioned phenol, o-phenylphenol, p-phenylphenol, β-naphthol, p-cumylphenol, m-cumylphenol, p-t-butylphenol, 2,6-dimethylphenol, isopropyl alcohol, t-butyl alcohol, n-decyl alcohol, n-octyl alcohol, m-cresol, o-cresol, 2,6-di-t-butyl-4-methylphenol and fluorine-substituted aliphatic alcohols.

The polymer may contain various stabilizers incorporated therein for the purpose of further enhancing stability of the polymer and preventing the coloring. As concrete examples of the compounds, there may be mentioned phosphorous acid, diethyl phosphite, diphenyl phosphite, triethyl phosphite, tricresyl phosphite, trioctyl phosphite, tridecyl phosphite, 2-(2'-hydroxy-5'-methylphenyl)benzotriazole, 2-(2'-hydroxy-5'-ethylphenyl)benzotriazole, pyrogallol, organotin mercaptides, sodium dithionite, polyphenylene, active anthracene, low polyesters of bisphenols, and phosphorous acid triester polymers obtained by reacting a bisphenol or dialcohol with phosphorus trichloride. They may be contained in the polymer generally in an amount in the range of 0.01–5%.

The polymers of the present invention do not have too high viscosity in molten form, while they have a high heat resistance. They have, therefore, an excellent workability. However, if necessary, there may be incorporated for the purpose of reducing melt viscosity tricresyl phosphate, triphenyl phosphate, triethyl phosphate, tricresyl phosphite, trioctyl phosphite, dioctyl phthalate, dinonyl phthalate, calcium stearate, magnesium stearate, or an ester produced from 2 molecules of a bisphenol with one molecular of succinic acid, adipic acid or sebacic acid. Tthese additives may be contained therein in an amount in the range of 0.1–30 wt. % based on the total weight of the polymer.

The polymer of the present invention can be molded into desired shapes by an ordinary processing method under ordinary conditions. More particularly, the polymer can be molded by compression, extrusion or injection molding method using an ordinary molding machine having capacity not particularly increased. The intended moldings can be obtained in a desired state without causing haze or cracks.

The extrusion and injection molding conditions of the polymer of the present invention comprise a molding temperature in the range of 250°–400° C., preferably 280°–380° C. However, as described above, the molding temperature can be lowered greatly by incorporating a melt viscosity-reducing compound or a stabilizer. The size or shape of the moldings is not limited. Various moldings such as films, sheets and parts having precise, fine structures in addition to ordinary molded articles can be produced easily.

Further, films can be formed from a solution of the polymer of the present invention by casting method. The thus obtained films have high transparency, toughness and heat resistance like films formed by the extrusion method.

The following examples further illustrate the polymers of the present invention. The logarithmic viscosity number $\eta_{inh.}$ in the following examples is determined according to the following formula with a 0.5 g/l solution in a solvent mixture of phenol/tetrachloroethane (wt. ratio: 6/4):

$$\eta_{inh.} = \frac{1}{C} \log e^{\frac{t_1}{t_2}}$$

wherein $t_1$ represents a flow time of the polymer solution, $t_2$ represents a flow time of the solvent alone and C represents a concentration of the polymer solution (g/dl).

Parts, percentages and ratios in the following examples are given by weight unless otherwise stated.

EXAMPLE 1

75.1 g (0.30 mol) of bis(4-hydroxyphenyl) sulfone and 45.7 g (0.20 mol) of 2,2-bis(4'-hydroxyphenyl)propane were charged in a reaction flask. 500 ml of dichloromethane was added to the mixture to obtain a solution. 153 ml (1.10 mols) of triethylamine was added to the solution and the whole was stirred to obtain a homogeneous solution. 101.5 g (0.50 mol) of a mixture of isophthaloyl chloride and terephthaloyl chloride (1:1) was dissolved in 500 ml of dichloromethane and the resulting solution was added dropwise to the solution in the above reaction flask under ice-cooling and stirring over 15 minutes. The stirring was continued under ice-cooling for one hour and then at room temperature for 5 h. The reaction liquid was sampled and analyzed by means of the low molecular weight gel permeation chromatography to reveal that no unreacted monomer was present (Column: Finepak GEL 101, 7.2$\phi \times$500 mm, Developer: tetrahydrofuran, Flow rate: 0.5 ml/min, Pressure: 28 kg/cm$^2$G, Room temperature). Then, the reaction liquid was washed with 1 l of water twice. The thus washed dichloromethane solution was added to 5 l of methanol under vigorous stirring with a homomixer to precipitate a polymer. The polymer was filtered out, washed with water and methanol and dried to obtain 179 g of a powdery polymer.

The resulting polymer had a logarithmic viscosity number of 0.78. According to the NMR spectrum, a ratio of bis(4-hydroxyphenyl) sulfone residue to 2,2-bis(4'-hydroxyphenyl)propane residue in the polymer was about 3:2. The polymer was analyzed by means of gel permeation chromatography. The chromatogram obtained showed a single peak (Column: Shodex A-804, 8$\phi \times$500 mm, Developer: tetrahydrofuran, Flow rate: 1.0 ml/min, Pressure: 10 kg/cm$^2$G, Room temperature). It was thus confirmed that a homogeneous copolycondensate was formed.

EXAMPLE 2

100.1 g (0.40 mol) of bis(4-hydroxyphenyl) sulfone, 22.8 g (0.10 mol) of 2,2-bis(4'-hydroxyphenyl)-propae and 3.4 g (0.02 mol) of o-phenylphenol were charged in a reactor. 510 g of an 8% aqueous sodium hydroxide solution was added thereto to obtain a solution, which was then cooled to 10° C. N$_2$ stream was introduced into the solution for 30 min and then 0.2 g of cetyltrimethylammonium bromide was added. 101.5 g (0.50 mol) of a solution of a mixture of isophthaloyl chloride and terephthaloyl chloride (1:1) in 2 l of dichloromethane was added at once to the solution in the above-mentioned reaction vessel which was stirred at a temperature kept at 10° C. The stirring was continued for one hour while the temperature was kept at 10° C. The reaction liquid was sampled and analyzed by means of the low molecular weight gel permeation chromatography to reveal that no unreacted monomer was present.

Then, 40 ml of a 1 N aqueous hydrochloric acid solution was added thereto. 2 l of water was added to the mixture and the whole was stirred and allowed to stand. A lower layer thus formed was separated out and washed twice each with 2 l of water. The dichloromethane layer thus washed was added to 5 l of methanol under stirring at a high rate using a homomixer to precipitate a polymer. The colorless polymer thus formed was filtered out, washed with methanol and dried to obtain 187 g of a powdery polymer.

The resulting polymer had a logarithmic viscosity number of 0.72. According to the NMR spectrum, a ratio of bis(4-hydroxyphenyl) sulfone residue to 2,2-bis(4'-hydroxyphenyl)propane residue in the polymer was about 4:1.

EXAMPLE 3

112.6 g (0.45 mol) of bis(4-hydroxphenyl) sulfone, 11.4 g (0.05 mol) of 2,2-bis(4'-hydroxyphenyl)-propane and 162.3 g (0.54 mol) of a mixture of diphenyl isophthalate and diphenyl terephthalate (6:4) were mixed thoroughly. 30 mg of LiBH$_4$ was added to the mixture and mixed. The mixture was charged in a reaction vessel, gradually heated to approximately 150° C. for melting and stirred. The pressure in the reaction vessel was gradually reduced and the heating was further continued while phenol was distilled out. The mixture was heated to around 250°-300° C. for 3 h to complete the distillation of phenol. The reaction mixture was highly viscous and the stirring was almost impossible after the major portion of phenol was distilled out. The reaction liquid was sampled and analyzed by means of the low molecular weight gel permeation chromatography to reveal that no unreacted monomer was present.

After completion of the reaction, the product was dissolved in 1 l of chloroform and added dropwise to 5 l of methanol vigorously stirred using a homomixer to precipitate a polymer. The polymer thus formed was filtered out, washed with methanol and dried to obtain 170 g of a polymer.

The resulting polymer had a logarithmic viscosity number of 0.58. According to the NMR spectrum, a ratio of bis(4-hydroxyphenyl) sulfone residue to 2,2-bis(4'-hydroxyphenyl)propane residue in the polymer was about 9:1.

EXAMPLE 4

The reaction and after-treatment were carried out in the same manner as in Example 2 except that 2,2-bis(4'-hydroxphenyl)propane was replaced with 21.8 g (0.10 mol) of bis(4-hydroxyphenyl) sulfide to obtain 185 g of a colorless, powdery polymer. The resulting polymer had a logarithmic viscosity number of 0.73.

EXAMPLE 5

The reaction and after-treatment were carried out in the same manner as in Example 3 except that 2,2-bis(4'-hydroxphenyl)propane was replaced with 14.2 g (0.05 mol) of 2,2-bis(3',5'-dimethyl-4'-hydroxyphenyl)propane to obtain 180 g of a colorless, powdery polymer. The resulting polymer had a logarithmic viscosity number of 0.46.

EXAMPLE 6

The reaction and after-treatment were carried out in the same manner as in Example 2 except that 62.6 g (0.25 mol) of bis(4-hydroxyphenyl) sulfone and 57.1 g (0.25 mol) of 2,2-bis(4'-hydroxyphenyl)propane were used to obtain 179 g of a colorless, powdery polymer.

The resulting polymer had a logarithmic viscosity number of 0.46. According to the NMR spectrum, a ratio of bis(4-hydroxyphenyl) sulfone residue to 2,2-bis(4'-hydroxyphenyl)propane residue was about 1:1.

EXAMPLE 7

The reaction and after-treatment were carried out in the same manner as in Example 1 except that 2,2-bis(4'-hydroxyphenyl)propane was replaced with 48.2 g (0.20 mol) of 3,3',5,5'-tetramethyl-4,4'-dihydroxybiphenyl to obtain 179 g of a colorless, powdery polymer.

The resulting polymer had a logarithmic viscosity number of 0.55.

EXAMPLE 8

The reaction and after-treatment were carried out in the same manner as in Example 2 except that 62.6 g (0.25 mol) of bis(4-hydroxyphenyl) sulfone and 54.6 g (0.25 mol) of bis(4-hydroxyphenyl) sulfide were used to obtain 168 g of a colorless, powdery polymer.

The resulting polymer had a logarithmic viscosity number of 0.52.

EXAMPLE 9

The reaction and after-treatment were carried out in the same manner as in Example 2 except that 87.6 g (0.35 mol) of bis(4-hydroxyphenyl) sulfone and 30.3 g (0.15 mol) of bis(4-hydroxyphenyl) ether were used to obtain 176 g of a colorless, powdery polymer.

The resulting polymer had a logarithmic viscosity number of 0.75.

EXAMPLE 10

The reaction and after-treatment were carried out in the same manner as in Example 2 except that 95.1 g (0.38 mol) of bis(4-hydroxyphenyl) sulfone and 25.7 g (0.12 mol) of bis(4-hydroxyphenyl) ketone were used to obtain 182 g of a colorless, powdery polymer.

The resulting polymer had a logarithmic viscosity number of 0.68.

COMPARATIVE EXAMPLE 1

The reaction was carried out in the same manner as in Example 2 except that 125.1 g (0.50 mol) of bis(4-hydroxyphenyl) sulfone was used and 2,2-bis(4'-hydroxyphenyl)-propane was omitted. A dichloromethane layer washed with water after completion of the reaction was in the form of a milky, difficultly flowing gel. The gel was discharged into methanol stirred using a homomixer to precipitate a polymer. The resulting colorless polymer was filtered out, washed with methanol and dried to obtain 182 g of a dry, powdery polymer.

The resulting polymer had a logarithmic viscosity number of 0.63. In the gel permeation chromatography carried out under the same conditions as in Example 1, a subpeak in a lower molecule side than the main peak was recognized in addition to the main peak.

COMPARATIVE EXAMPLE 2

The reaction and after-treatment were carried out in the same manner as in Example 2 except that 114.1 g (0.50 mol) of 2,2-bis(4'-hydroxyphenyl)propane was used and bis(4-hydroxyphenyl) sulfone was omitted to obtain 177 g of a colorless, powdery polymer.

The resulting polymer had a logarithmic viscosity number of 0.76. According to the NMR spectrum, the polymer was identified with the intended polymer.

COMPARATIVE EXAMPLE 3

30.4 g of the powdery polymer obtained in Comparative Example 1 and 7.2 g of the powdery polymer obtained in Comparative Example 2 were dissolved in 1 l of dichloromethane under stirring at room temperature, wherein a ratio of the number of bis(4-hydroxyphenyl) sulfone residue in the polymer of Comparative Example 1 to the number of 2,2-bis(4'-hydroxyphenyl)propane residue in the polymer of Comparative Example 2 was 4:1. The resulting colorless, transparent solution was added to 5 l of methanol which was being vigorously stirred using a homomixer to precipitate a polymer. The polymer thus formed was filtered out, washed with methanol and dried at 150° C. under reduced pressure (5 mmHg) for 5 hours to obtain 36.1 g of a colorless, powdery polymer. The resulting polymer had a logarithmic viscosity number of 0.67. According to the NMR spectrum, a ratio of bis(4-hydroxyphenyl) sulfone residue to 2,2-bis(4-hydroxyphenyl)propane residue in the polymer was 4:1. In the chromatogram obtained by means of the gel permeation chromatography, a broad shoulder was recognized beside the main peak, i.e. a single peak with good symmetry was not recognized.

EXAMPLE 11

The polymers obtained in Examples 2, 4, 6 and 8 and Comparative Examples 1, 2 and 3 were pressed at 300° C. under 100 kg/cm²G to form sheets having a thickness of 0.5 mm. Softening points of the polymers were measured according to TMA (thermomechanical analysis) method. The results are shown in Table 1. In the TMA, the penetration method was employed at a temperature elevation rate of 2.5° C./min under a pressure of 10 g. 50 cc/min of He was used as the purging gas. A straight line was drawn at an angle of 45° to the time axis on the penetration curve and the softening point was determined from a temperature corresponding to the point of intersection. A device used was TMS-1 (a product of Perkin-Elmer Co.).

TABLE 1

|  | Softening temp. (°C.) |
|---|---|
| Ex. 2 | 262.0 |
| Ex. 4 | 256.2 |
| Ex. 6 | 229.4 |
| Ex. 8 | 221.6 |
| Comp. Ex. 1* | 265.1 |
| Comp. Ex. 2 | 176.2 |
| Comp. Ex. 3 | 178.6 |

*The sheets obtained by pressing the polymer of Comparative Example 1 were opaque and quite brittle.

It will be understood that as compared with the polyester containing only 2,2-bis(4'-hydroxyphenyl)propane as the bisphenol obtained in Comparative Example 2, the polyesters of the present invention obtained in Examples 2, 4, 6 and 8 have far higher softening points and thus can be used at a higher temperature.

The polyester containing only bis(4-hydroxyphenyl)sulfone as the bisphenol obtained in Comparative Example 1 had a high softening point but sheets obtained therefrom by heat-pressing were opaque and brittle and had no practical strength.

The sheet made of the polyester of Comparative Example 3 was not brittler than that made of the polyester of Comparative Example 1. But the polyester of Comparative Example 3 had far lower softening point as compared with the polyesters of Examples.

EXAMPLE 12

The powdery polymers obtained in Example 2 and Comparative Example 3 were pressed at 300° C. under 100 kg/cm²G to form sheets having a thickness of 0.5 mm. The resulting sheets were allowed to stand in a standard Geer type aging tester at indicated hours. The transition of logarithmic viscosity was determined with regard to each sheet. The results are shown in Table 2.

TABLE 2

| | $\eta_{inh}$ retention ratio (%)* | |
|---|---|---|
| | Sample | |
| Treating time (hrs) | Ex. 2 | Comp. Ex. 3 |
| 100 | 94 | 88 |
| 200 | 89 | 77 |
| 300 | 86 | 68 |

TABLE 2-continued

| | $\eta_{inh}$ retention ratio (%)* | |
|---|---|---|
| | Sample | |
| Treating time (hrs) | Ex. 2 | Comp. Ex. 3 |
| 400 | 83 | 58 |

*Ratio of the $\eta_{inh}$ of treated sheet to the $\eta_{inh}$ of untreated sheet.

EXAMPLE 13

About 2 kg of a polymer having a ratio of bis(4-hydroxyphenyl)sulfone residue to 2,2-bis(4'-hydroxyphenyl)propane of 4:1 obtained in the same manner and under the same conditions as in Example 2 was dried at 150° C. under reduced pressure for 3 h and then extruded by means of a 40 mm extruder (a product of Takayasu Co., Ltd.) for pelletization. Temperatures in the extruder (°C.) were as follows:

| $C_1$-zone | $C_2$-zone | $C_3$-zone | $C_4$-zone | Die |
|---|---|---|---|---|
| 220 | 260 | 270 | 300 | 290 |

A strand obtained by the extrusion was colorless and transparent. The extrusion rate was practically reasonable. The resulting pellets were dried at 150° C. for 2 h and then injection-molded using an Arburg injection molding machine. The injection molding conditions were as follows:

| Barrel temperature: | 320° C. |
|---|---|
| Mold temperature: | 140° C. |
| Injection pressure: | 1400 kg/cm²G |

Transparent, colorless moldings could be obtained under the above-mentioned injection conditions. Physical properties measured are shown in Table 3.

Polymers were produced each in an amount of 2 kg in the same manner as in Examples 4, 6 and 8 and Comparative Examples 1 and 2 and extrusion-molded into pellets in the same manner as above. The pellets were injection-molded under conditions shown in Table 3 to obtain products having physical properties shown in Table 3.

In case the polymer corresponding to the product of Comparative Example 1 was extruded under the above-mentioned conditions, an opaque, quite brittle strand was obtained. Thus, the pellets could not be injection-molded.

It is apparent from Table 3 that the injection-molded polymers of the present invention had practically sufficient mechanical strength.

TABLE 3

|  | Ex. 2 | Ex. 4 | Ex. 6 | Ex. 8 | Comp. Ex. 2 |
|---|---|---|---|---|---|
| Injection molding conditions | | | | | |
| Barrel temp. (°C.) | 340 | 330 | 330 | 320 | 330 |
| Mold temp. (°C.) | 130 | 140 | 130 | 130 | 130 |
| Injection pressure (kg/cm²) | 1,400 | 1,360 | 1,010 | 1,180 | 1,210 |
| Physical properties | | | | | |
| Tensile strength (kg/cm²) (ASTM D-638) | 743 | 762 | 753 | 795 | 738 |
| Modulus in tension (kg/cm²) (ASTM D-638) | 17,500 | 18,500 | 19,700 | 21,400 | 19,300 |
| Breaking extension | 31 | 48 | 25 | 35 | 35 |

TABLE 3-continued

|  | Ex. 2 | Ex. 4 | Ex. 6 | Ex. 8 | Comp. Ex. 2 |
|---|---|---|---|---|---|
| (%) (ASTM D-638) |  |  |  |  |  |
| Bending strength (kg/cm$^2$) (ASTM D-790) | 1,010 | 975 | 930 | 1,120 | 960 |
| Bending modulus (kg/cm$^2$) (ASTM D-790) | 21,100 | 19,300 | 20,600 | 19,400 | 18,100 |
| Izod impact strength with notch (kg · cm/cm) (ASTM D-256) | 8.5 | 11.0 | 12.2 | 10.2 | 9.8 |

Industrial Applicability

As described above, from aromatic polyesters according to the present invention, colorless, transparent moldings can be obtained by compression, extrusion or injection molding methods, and the products thus obtained have excellent mechanical properties and improved heat resistance.

We claim:

1. An aromatic polyester comprising the structural units shown by the following formulae A, B and C:

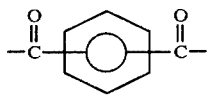
A

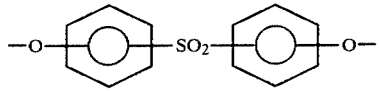
B

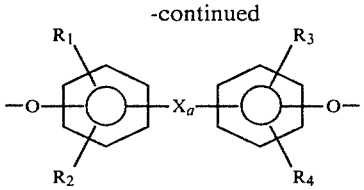
C wherein two carbonyl groups in formula A are in a meta or paraposition with each other, an oxygen atom in formula B is in a meta or paraposition with an SO$_2$ group, an oxygen atom in formula C is in a meta or paraposition to X, X in formula C represents a divalent hydrocarbon group having 1–10 carbon atoms, O, CO, S, SO or SO$_2$, a is 0 or 1, and R$_1$ to R$_4$ are the same or different and each represent hydrogen, a hydrocarbon group having 1–8 carbon atoms or a halogen atom with a proviso that when X is SO$_2$, it is excluded that all of R$_1$ to R$_4$ are hydrogen, a ratio of the number of structural unit A to the number of structural unit B being 1:0.36–1.06, a ratio of the number of structural unit A to the number of structural unit C being 1:0.04–0.66, a ratio of the number of structural unit A to the number of structural units B and C being 1:0.99–1.10 and logarithmic viscosity number of the polymer being 0.2–2.0.

2. A polyester according to claim 1 wherein the dicarboxylic acid component corresponding to the structural unit of said formula A is a mixture of isophthalic acid residue and terephthalic acid residue in a molar ratio of 5:95 to 95:5.

3. A polyester according to claim 2 wherein the dicarboxylic acid component is a mixture of isophthalic acid residue and terephthalic acid residue in a molar ratio of 30:70 to 70:30.

4. A polyester according to claim 1 wherein the bisphenol corresponding to the structural unit of said formula C is selected from the group consisting of 2,2-bis(4'-hydroxyphenyl)propane, bis(4-hydroxyphenyl)methane, 2,2-bis(3',5'-dimethyl-4'-hydroxyphenyl)propane, bis(4-hydroxyphenyl)ether, bis(4-hydroxyphenyl)sulfide, bis(3,5-dimethyl-4-hydroxyphenyl)sulfone, 4,4'-dihydroxybiphenyl, 3,3',5,5'-tetramethyl-4,4'-dihydroxybiphenyl and bis(4-hydroxyphenyl)ketone.

5. A polyester according to claim 1 wherein a terminal group of the polymer is a monohydric phenol residue.

* * * * *

UNITED STATES PATENT AND TRADEMARK OFFICE
CERTIFICATE OF CORRECTION

PATENT NO. : 4,440,920
DATED : April 3, 1984
INVENTOR(S) : Shiro Fujikake et al

It is certified that error appears in the above—identified patent and that said Letters Patent is hereby corrected as shown below:

Col. 2, line 32, change "a" to --$\underline{a}$--.

Col. 3, line 32, change "a" to --$\underline{a}$--.

Col. 5, line 17, change "Tthese" to --These--.

Claim 1, Col. 12, line 16, change "a" to --$\underline{a}$--.

Signed and Sealed this

Fourth Day of September 1984

[SEAL]

Attest:

GERALD J. MOSSINGHOFF

Attesting Officer

Commissioner of Patents and Trademarks